US010129284B2

(12) United States Patent
Peterson (10) Patent No.: US 10,129,284 B2
(45) Date of Patent: Nov. 13, 2018

(54) SYSTEM AND METHOD FOR AUTOMATED CONFIGURATION OF APPLICATION FIREWALLS

(71) Applicant: Veracode, Inc., Burlington, MA (US)

(72) Inventor: Erik J. Peterson, Andover, MA (US)

(73) Assignee: Veracode, Inc., Burlington, MA (US)

( * ) Notice: Subject to any disclaimer, the term of this patent is extended or adjusted under 35 U.S.C. 154(b) by 0 days.

(21) Appl. No.: 14/496,778

(22) Filed: Sep. 25, 2014

(65) Prior Publication Data

US 2015/0143502 A1 May 21, 2015

Related U.S. Application Data

(60) Provisional application No. 61/882,343, filed on Sep. 25, 2013.

(51) Int. Cl.
*H04L 29/06* (2006.01)

(52) U.S. Cl.
CPC ...... *H04L 63/1433* (2013.01); *H04L 63/0245* (2013.01); *H04L 63/0263* (2013.01); *H04L 63/1483* (2013.01)

(58) Field of Classification Search
CPC .... H04L 63/029; H04L 63/14; H04L 63/0227
USPC .......................................................... 726/11
See application file for complete search history.

(56) References Cited

U.S. PATENT DOCUMENTS

| 2002/0023228 | A1* | 2/2002 | Schlesinger | .......... H04L 63/029 726/11 |
| 2003/0051163 | A1* | 3/2003 | Bidaud | ................ G06F 21/577 726/25 |
| 2008/0163353 | A1* | 7/2008 | Conti | ................ G06F 12/1483 726/11 |
| 2009/0006841 | A1* | 1/2009 | Ormazabal | ......... H04L 63/1458 713/152 |
| 2009/0013398 | A1* | 1/2009 | Cookmeyer, II | .... H04L 12/2697 726/11 |
| 2009/0296571 | A1* | 12/2009 | McCourt | ............... G06F 15/173 370/225 |
| 2011/0138456 | A1* | 6/2011 | Ormazabal | ......... H04L 12/2697 726/11 |
| 2013/0019314 | A1* | 1/2013 | Ji | ........................... H04L 67/02 726/25 |
| 2013/0298221 | A1* | 11/2013 | Smith | ................ H04L 63/0414 726/13 |

* cited by examiner

*Primary Examiner* — Teshome Hailu
(74) *Attorney, Agent, or Firm* — Gilliam IP PLLC (57) ABSTRACT

In a system for configuring a web application firewall, one or more parameters of the firewall are adjusted such that a test configured for exposing a vulnerability of an application protected by the application firewall is blocked by the firewall and another test configured to invoke functionality of the application but that does not expose or exploit any security vulnerability is not blocked by the firewall. A notification is provided to a user if such a firewall configuration is not found after a specified number of attempts.

23 Claims, 3 Drawing Sheets

SYSTEM AND METHOD FOR AUTOMATED CONFIGURATION OF APPLICATION FIREWALLS

CROSS-REFERENCE TO RELATED APPLICATIONS

This application claims the benefit of and priority to U.S. Provisional Patent Application Ser. No. 61/882,343, entitled "A System and Method for Automated Configuration of Application Firewalls," filed on Sep. 25, 2013, which is incorporated herein by reference in its entirety.

FIELD OF THE INVENTION

The present invention generally relates to detection of vulnerabilities in software applications and to mitigation of the exploitation of those vulnerabilities, and more particularly to systems and methods for configuring firewalls to reduce exploitation of the software vulnerabilities.

BACKGROUND OF THE INVENTION

Using the Internet, people can access software applications such as banking applications, airline reservation systems, corporate email and business applications, etc., from virtually anywhere. While this provides convenient access to people to the information they need, any vulnerabilities in a software application may also be exposed to any user remotely accessing the software. Some users may accidently or intentionally exploit these vulnerabilities. For example, they may retrieve information without authorization, may change such information, cause an unauthorized change in behavior the software application, or may stop its operation altogether.

One way to prevent such unauthorized access is to provide a firewall around a software application. Application firewalls are typically designed to protect an application against attack or the exploitation of vulnerabilities in the application. To do so the firewalls often require a complex configuration based on, at least in part, a number of selectable, tunable parameters. If the number of configuration parameters is large, manually fine tuning a configuration such that it prevents substantially all attacks while allowing substantially all legitimate access can require significant skill, and can be error prone, if not infeasible. In fact, many web application firewalls are typically misconfigured, i.e., they are either too restrictive, blocking legitimate user activity, or not restrictive enough, allowing attackers to exploit vulnerabilities. Such misconfiguration can significantly limit the usefulness and value of an application firewall and the associated application. Therefore, there is a need for an improved system and/or method for protection of software applications.

SUMMARY OF THE INVENTION

Various embodiments of the present invention can detect vulnerabilities in software applications, mitigate the exploitation of those vulnerabilities, or both, by providing a firewall optimized according to the application to be protected. This is achieved, in part, by receiving a current configuration of an application firewall, and a notification of a defect in the software application. Various tests are generated in an iterative manner to exploit a vulnerability of the software that may be caused by the identified defect. If the test can exploit the vulnerability, one or more configuration parameters are adjusted so as to make the firewall configuration more restrictive, so that the test would be blocked by the firewall.

Additional tests are generated to ensure that legitimate access to data and functionality of the software application are not restricted by the updated firewall configuration. If such legitimate access is blocked, one or more firewall configuration is adjusted again such that the legitimate access is granted while the test exploiting the defect is still blocked. After a specified number of iterations, if a firewall configuration that can achieve both of these objectives cannot be found, the notified defect is flagged. In that event, the application developer can cure the defect in another manner, e.g., by modifying the software application.

The above-described process can be repeated for another notified defect. The defects may also be detected, e.g., via testing of the software application, in addition to receiving the notification of the defects or in the alternative thereto. In this way, a configuration that is not overly restrictive but mitigates or blocks exploitation of vulnerabilities associated with some or all of the notified defects, can be accomplished. Advantageously, any defects that cannot be cured using a configuration optimized for mitigating or preventing the exploitation of various other defects can be flagged, so that the application developer may attend only to those flagged defects. Thus, the software application can be accessed in a beneficial and safe manner.

Accordingly, in one aspect a method for configuring an application firewall includes: (a) receiving in memory a current application firewall configuration. The method also includes (b) transmitting to the application, through the application firewall, a first test that is adapted to expose an identified security defect in the application. If configured correctly, the firewall desirably blocks the first test. Therefore, the method includes (c) if the application firewall fails to block the transmission of the first test to the application, determining a modification to a first parameter of the application firewall. The method also includes adjusting the first parameter according to the determined modification, so as to block the transmission of the first test to the application. While a firewall thus configured may block a request that can expose or exploit a security defect, the application firewall desirably does not block a legitimate request. As such, the method includes (d) transmitting to the application, through the application firewall, a second test adapted to invoke a functionality of the application. The method also includes and determining if the functionality was invoked according to a benchmark.

In some embodiments, the method includes identifying a security defect in an application to be protected by the application firewall. Identifying the security defect may include analyzing an architecture of the application. The method may also include accessing information associated with the application, and generating the application architecture based on, at least in part, the accessed information. In some embodiments, identifying the security defect includes identifying an input field within the application, that is vulnerable to a cross-site scripting attack.

After the modification of a firewall parameter such that the firewall can block a test that can expose or exploit an application vulnerability, if the application firewall fails to pass through a legitimate request, the firewall is desirably reconfigured to permit such access, while still blocking the test that can expos or exploit an application vulnerability. Therefore, in some embodiments, the method includes if, after the transmission of the second test, the functionality was not invoked according to the benchmark, determining a modification to either the first parameter or a second parameter of the application firewall, or both, so as to permit invocation of the functionality according to the benchmark, in response to retransmission of the second test. The method may also include if the modified application firewall fails to block the transmission of the first test to the application, determining one or more of: (i) another modification to the first parameter, (ii) another modification to the second parameter, and (iii) a modification to a third parameter of the application firewall, so as to block the transmission of the first test to the application. The method may also include, if the modified application firewall fails to block the transmission of the first test to the application, notifying a user that the identified security defect was not blocked by the application firewall.

In some embodiments, determining if the functionality was invoked according to the benchmark includes requesting and receiving transaction data from the application firewall, and determining using the transaction data if the application firewall blocked the transmission of the second test to the application. Alternatively, or in addition, determining if the functionality was invoked according to the benchmark may include receiving, through the application firewall, a response of the application, and comparing the response to the benchmark. In some embodiments, the method includes generating benchmarks for legitimate tests by transmitting the second test to the application directly, and recording a response received directly from the application as the benchmark.

The identified security defect may be related to one or more of SQL injection, denial of service, credit card exposure, buffer overflow, Operating System (OS) command injection, and phishing. In some embodiments, several parameters, which include the first parameter, are associated with the application firewall. Any of these parameters can be request limits parameters, cookie parameters, URL protection parameters, or parameters specifying processing of special characters or keywords.

In another aspect, a computer system includes a first processor and a first memory coupled to the first processor. The first memory includes instructions which, when executed by a processing unit that includes the first processor and/or a second processor, program the processing unit to: (a) receive in a memory module that includes the first memory and/or a second memory coupled to the second processor, a current application firewall configuration. The instructions also program the processing unit to (b) transmit to the application, through the application firewall, a first test that is adapted to expose an identified security defect in the application. Additionally, the instructions program the processing unit to (c) if the application firewall fails to block the transmission of the first test to the application, determine a modification to a first parameter of the application firewall and adjust the first parameter according to the determined modification, so as to block the transmission of the first test to the application. Moreover, the instructions program the processing unit to (d) transmit to the application, through the application firewall, a second test adapted to invoke a functionality of the application and determine if the functionality was invoked according to a benchmark. In some embodiments, the second memory coupled to the second processor can receive through a network the instruction stored in the first memory. In various embodiments, the instructions can program the processing unit to perform one or more of the method steps described above.

In another aspect, an article of manufacture that includes a non-transitory storage medium has stored therein instructions which, when executed by a processor program the processor to (a) receive in memory coupled to the processor, a current application firewall configuration. The instructions also program the processor to (b) transmit to the application, through the application firewall, a first test that is adapted to expose an identified security defect in the application. Additionally, the instructions program the processor to (c) if the application firewall fails to block the transmission of the first test to the application, determine a modification to a first parameter of the application firewall and adjust the first parameter according to the determined modification, so as to block the transmission of the first test to the application. Moreover, the instructions program the processor to (d) transmit to the application, through the application firewall, a second test adapted to invoke a functionality of the application and determine if the functionality was invoked according to a benchmark. In various embodiments, the stored instructions can program the processor to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
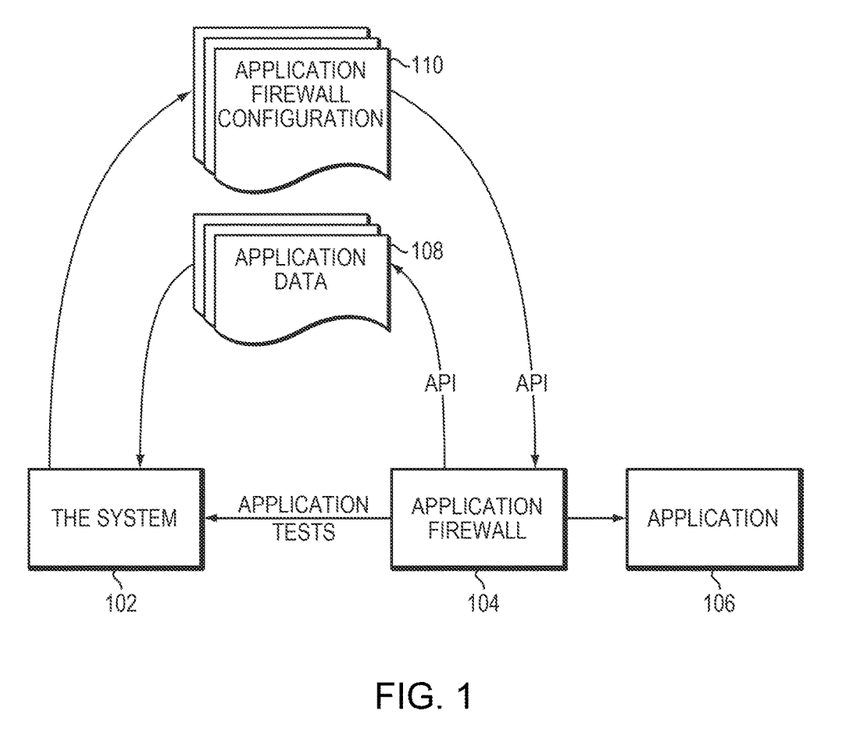
FIG. 1 schematically depicts firewall configuration system and the operating environment thereof, according to one embodiment.

With reference to FIG. 1, the firewall configuration system 102 can pass various tests to an application firewall 104. These tests (e.g., access requests) may be blocked by the firewall, completely or partially, or the entire or partial test may pass through the firewall 104 to the application 106 to be protected by the firewall. The application 106 may respond to a received test by supplying results and/or by changing its behavior thereof. The firewall 104 may send these results, including any detected change in the application behavior, to the firewall configuration system 102 which can use these results to determine whether one or more tests failed or succeeded. In general, a test that includes a legitimate access to the application 106 is considered to have failed, if the firewall 104 partially or completely blocks that test. Also, a test that can exploit a notified/detected vulnerability in the application 106 is also considered to have failed, if the firewall 104 does not at least partially block that test.

The firewall 104 can provide various application data 108 to the firewall configuration system 102 using an application program interface (API). These data can be used to determine the firewall configuration parameters 110, ranges and/or options of their values, and/or to determine one or more tests described above. The different firewall configuration parameters 110 can be adjusted using the application firewall configuration API. The system 102 can be deployed in an environment in which both a dynamic scanning system and the application firewall can be operated, and may be used by the same group of users using the dynamic scanning system and the application firewall for, e.g., detecting defects and vulnerabilities in the software application. The firewall 104 can be optimized according to the detected defects as well.

Figure 2:
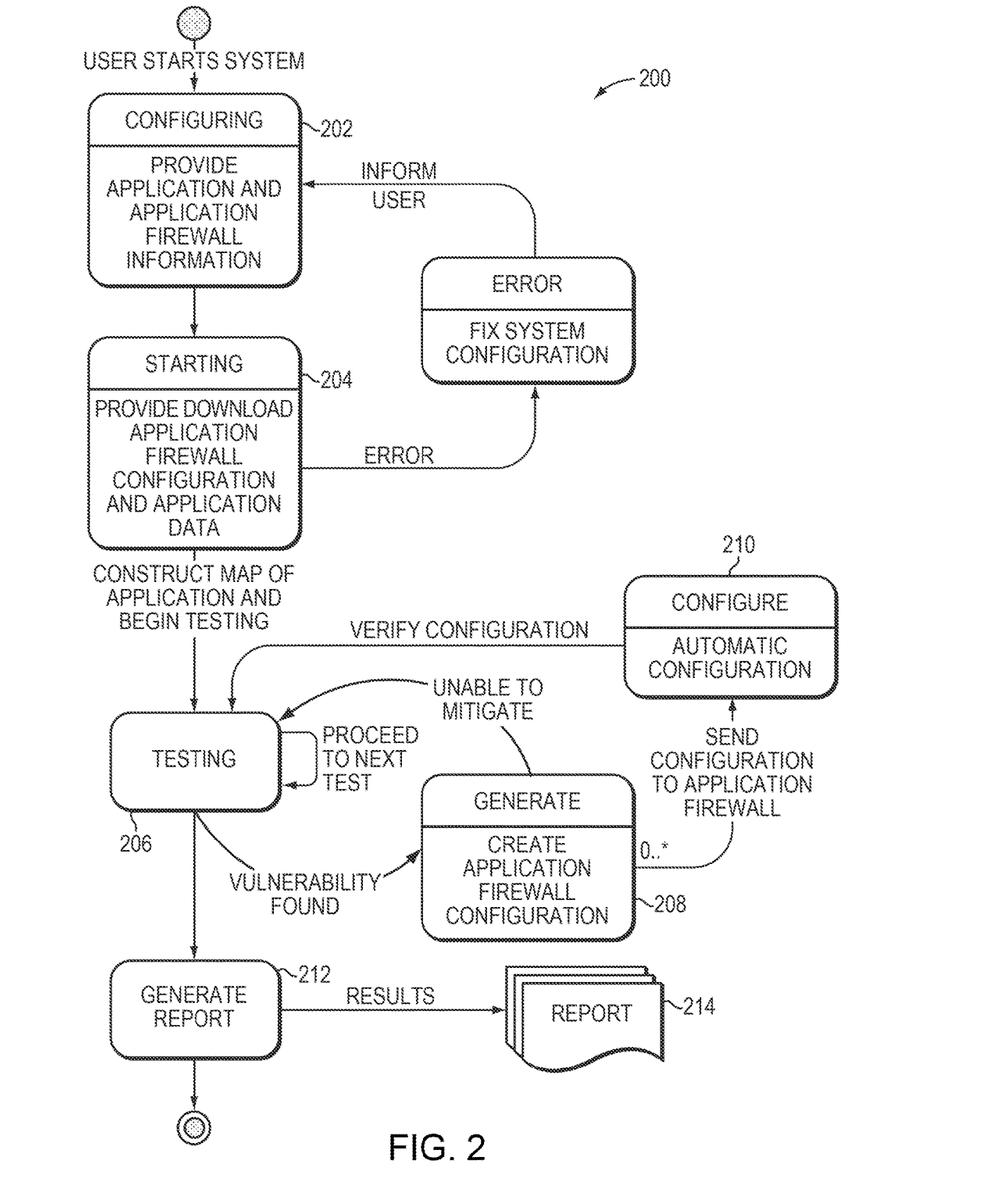
FIG. 2 depicts a flow diagram for optimizing a firewall configuration, according to one embodiment.

With reference to FIG. 2, in an exemplary process 200 for tuning/optimizing a firewall, a user sets up the firewall configuration system to test an application to be protected by the application firewall (step 202). The user connects the system to the application firewall using a API designed to allow the system and the application firewall to exchange information during the testing and configuration process (step 202). The user starts the testing process which may perform the following automated tasks: The firewall configuration system begins by downloading information that provides a map of the application under test and then uses that information to start testing the application (step 204). In some embodiments the application may be tested in its entirety while in other embodiments only selected portions of the application may be tested.

The system can download any existing application firewall configuration using the API to identify potential existing problems with the firewall configuration. The system tests the application for security defects and uses the API to observe if the application firewall is passing or blocking the tests (step 206). If the firewall configuration system identifies a security defect that leaves at least a part of the application vulnerable to attack, it then generates the necessary configuration to mitigate the vulnerability (step 208), and provides this information via the API to the application firewall (step 210). The system can verify that the configuration change mitigates the vulnerability, while allowing legitimate accesses to the application (the step 206). If successful, i.e., the exposed vulnerability is no longer exposed, the system continues testing (the step 206). If not, the system interacts with the application firewall and creates other configuration options (the steps 208, 210). After a defined period of time and/or a defined number of iterations, if ultimately unsuccessful, the system reports the identified vulnerability to a user at the end of the process (step 212 and report 214). Once the system has verified that the entire application (as defined by the configuration and information provided by the application firewall) has been tested, the system completes its testing and reports the results 214 to the user (the step 212).

Figure 3:
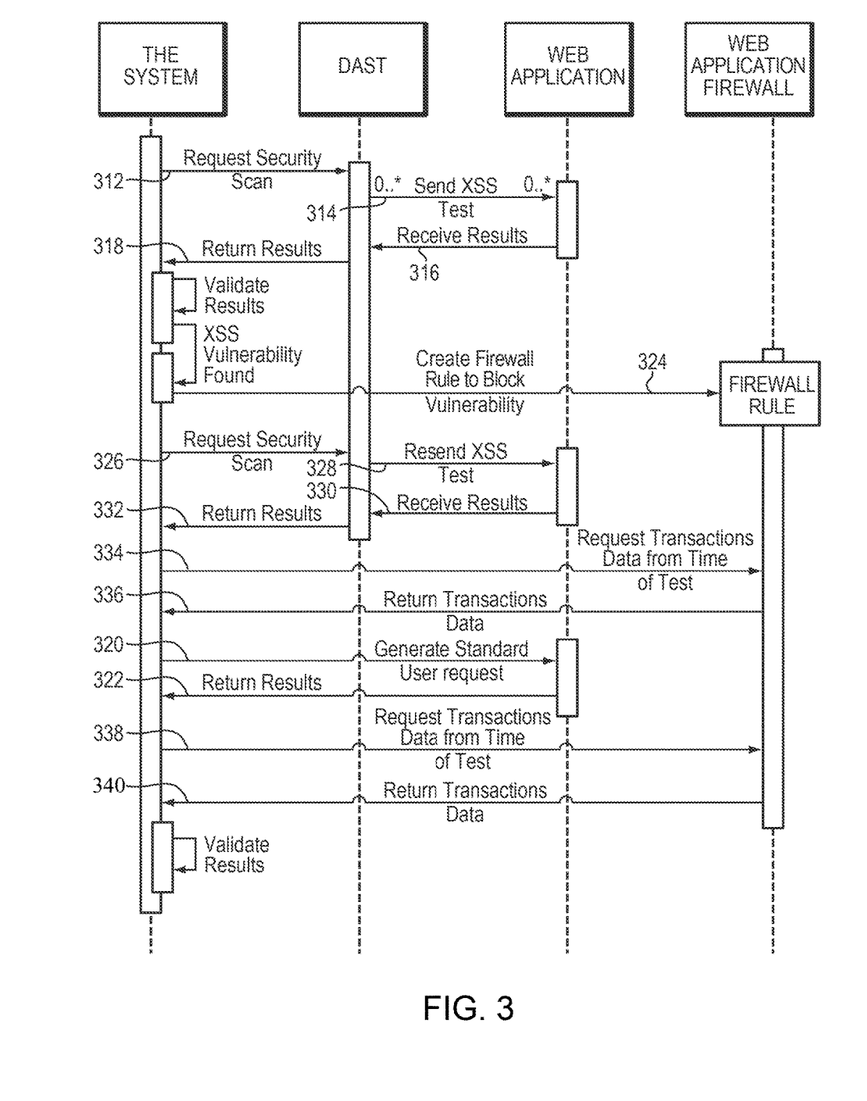
FIG. 3 schematically transactions associated with one embodiment of a firewall configuration system.

In one embodiment, a testing and firewall configuration system can be used to avoid or at least mitigate any harmful effects of cross-site scripting (XSS) vulnerabilities. With reference to FIG. 3, a testing and firewall configuration system 302 requests (in step 312) testing of an application 306 (e.g., a web application) using a testing system 304 e.g., Dynamic Application Security Test (DAST). In the context of XSS vulnerabilities, DAST 304 enumerates one or more input fields of web application 306. For one or more of the identified input fields, DAST 304 sends (step 314) one or more tests to the input field of the application 306 and, if an XSS vulnerability is determined to be present, records the result of the test (step 316). The corresponding test generally includes data/command that can expose or exploit an XSS vulnerability. A malicious user may generate malicious data/command similar to the test data/command in that the malicious data/command can also expose the XSS vulnerability in the same manner as the test data/command supplied by DAST 304 did, but the malicious data/command may further exploit the vulnerability, and can cause harm to the application 306 e.g., by stealing protected data, preventing the application 306 from performing its intended functions, etc. Therefore, it is desirable to block such malicious data/command using an application firewall 308, e.g., a Web Application Firewall (WAF). It is also desirable, however, that the WAF 308 not interfere with legitimate access requests to the application 306.

To this end, DAST 304 informs the system 302 that an XSS vulnerability has been found and shares details of the nature of the vulnerability and the details of the testing activity, including the data/command that exposed the XSS vulnerability (also called XSS test) (step 318). The XSS vulnerability and the corresponding XSS test may be obtained from other sources such as application data, prior testing data, etc. The system 302 then generates a typical user request (i.e., legitimate data/command) and sends that request to the input field of the application 306 that was determined to be vulnerable to an XSS attack (step 320). The system 302 also records a response from the application 306 (step 322). This response is recorded as a benchmark, i.e., the expected behavior of the application 306 to a legitimate request. The benchmark may be obtained from other sources such as from application data, prior testing, etc. It is desirable that the application firewall 308 not block the legitimate request and not cause the behavior of the application 306 to change with respect to any legitimate requests.

The system 302 then configures WAF 308 to protect the web application 306 from the detected and/or notified XSS vulnerability (step 324). The configuration can be achieved by adjusting one of several parameters and/or one or more security policies associated with an application firewall 308. Thereafter, the system 302 requests the DAST 304 to scan for a specific XSS vulnerability that was notified or found previously (step 326). The DAST 304 resends (step 328) the XSS test (e.g., the test that includes the data/command that exposed the XSS vulnerability) to the web application 306. This time, however, the XSS test is sent through WAF 308, now configured to protect the application 306 against the detected/notified XSS attack. DAST determines if the XSS vulnerability is still present and records the results obtained from the application 306 (step 330). The results may be received by the DAST 304 through the WAF 308. DAST 304 provides the results to the system 302 (step 332).

The system 302 requests transaction data from WAF 308 (step 334) and receives the requested data so as to determine if any data sent to or received from the application 306 was blocked by the application firewall 308 (step 336). Using the data received from DAST 304, WAF 308, or both, the system 302 also determines whether the XSS test sent again (in the step 328) was successful, i.e., the data/command included therein reached the application 306, or whether the XSS test was blocked by the application firewall 306, which is typically the desired result. If it is determined that the XSS test was blocked by the WAF 308, the system 302 determines that the retested XSS vulnerability is no longer exposed, and resends the legitimate user request through the WAF 308 to the application 306. The system 302 receives the results through the application firewall 308, and compares the result now obtained to previously recorded benchmark results (that were obtained in the step 322). As the previously recorded benchmark results represent the expected behavior of the application 306 in response to the legitimate request, any significant difference between the two results can indicate that the WAF 308, as configured in the step 324, may block one or more legitimate requests, and may thus interfere with the beneficial operation of the application 306. To ensure that such interference does not exist, the system 302 may also request transaction data from WAF 308 (step 338). The data received from the WAF 308 may be used to determine if any data exchanged between the system 302 and the application 306 was blocked by the WAF

308, to further determine whether the WAF 308 interfered with beneficial operation of the web application 306 (step 340).

If the previously recorded results are substantially similar to the results obtained in response to the retransmitted legitimate request, if the WAF 308 did not block any significant activity, and if the system 302 and/or DAST 304 confirm or have previously confirmed that the XSS vulnerability for which the XSS test was resent in the step 328 is no longer exposed, the system 302 may inform a user that an XSS vulnerability was found and was automatically blocked by the system 302.

If the vulnerability continues to be found after the system 302 configures the WAF in the step 324 and after DAST 302 resends the XSS step in the step 328, the system 302 may further configure the WAF 308 and repeat testing using the XSS test and the legitimate request, as described above. These steps may be repeated until a configuration of the WAF 308 that blocks the XSS test but does not block the legitimate request and does not cause the results obtained in response to the legitimate request to be substantially different than the benchmark results obtained in the step 322. More than one legitimate requests may also be used in each or some of the iterations, including in the first iteration of the testing and configuration process described herein. As a suitable configuration of the WAF 308 may not be found in some situations, the iterative procedure described herein may be terminated after a specified number of attempts or iterations, or after a specified duration. The system 302 may then inform the user that a vulnerability was found but that it was not blocked by system 302, so that the user may take any necessary action including fixing the vulnerability in the application 306 itself.

Embodiments of the testing and application firewall configuration systems and of the methods described herein are not limited to providing protection against XSS vulnerabilities only. Systematic, testing based application firewall configuration can be provided for protection from several other types of vulnerabilities including but not limited to SQL Injection, Denial of Service, Credit Card Exposure, Buffer Overflow, Operating System (OS) Command Injection, Phishing Attacks, etc. In order to provide protection against malicious data/commands while permitting legitimate requests to pass through the application firewall to the application, various parameters associated with an application firewall can be adjusted. The security policy of the firewall may also be updated and any parameters in the policy can be adjusted as well. Examples of such parameters include, but are not limited to, request limits parameters such as maximum request length, maximum request line length, maximum URL length, parameters specifying maximum values of one or more cookie parameters such as cookie name length, cookie value length, number of cookies, whether the cookies should be signed and encrypted, etc. Other parameters include URL protection parameters such as permitted methods for accessing information, such as GET, POST, PUT, TRACE, etc. Handling or processing of special characters such as single and double quotation marks, escape sequences, and SQL keywords, that may be used with one or more parameters can also be controlled or adjusted.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, I claim:

1. A method for configuring an application firewall, the method comprising the steps of:
   receiving in memory a current application firewall configuration comprising a first firewall configuration parameter and a value thereof;
   accessing information associated with an application to be protected by the application firewall;
   generating an application architecture based on, at least in part, the accessed information;
   identifying a security defect in the application, wherein identifying the security defect comprises analyzing the application architecture;
   transmitting through the application firewall, to the application, a first test that is adapted to expose the identified security defect in the application;
   if the application firewall fails to block the transmission of the first test to the application, determining a modification to the value of the first firewall configuration parameter of the application firewall and adjusting the first firewall configuration parameter according to the determined modification, so as to block the transmission of the first test to the application; and
   transmitting to the application, through the application firewall, a second test adapted to invoke a functionality of the application and determining if the functionality was invoked according to a benchmark, by receiving a result produced by the application, wherein the functionality of the application comprises functionality invoked in response to a user request.

2. The method of claim 1, further comprising:
   determining at least one user input field of the application to be protected by the application firewall; and
   providing, as part of the second test, test data to the user input field.

3. The method of claim 1, wherein identifying the security defect comprises identifying an input field within the application that is vulnerable to a cross-site scripting attack.

4. The method of claim 1, further comprising:
   if, after the transmission of the second test, the functionality was not invoked according to the benchmark, determining a modification to at least one of the value of the first firewall configuration parameter and a value of a second firewall configuration parameter of the application firewall so as to permit invocation of the functionality according to the benchmark, in response to retransmission of the second test.

5. The method of claim 4, further comprising:
   if the modified application firewall fails to block the transmission of the first test to the application, determining at least one of: (i) another modification to the value of the first firewall configuration parameter, (ii) another modification to the value of the second firewall configuration parameter, and (iii) a modification to a value of a third firewall configuration parameter of the application firewall, so as to block the transmission of the first test to the application.

6. The method of claim 4, further comprising:
   if the modified application firewall fails to block the transmission of the first test to the application, notifying a user that the identified security defect was not blocked by the application firewall.

7. The method of claim 1, wherein determining if the functionality was invoked according to the benchmark comprises:
   requesting and receiving transaction data from the application firewall; and
   determining using the transaction data if the application firewall blocked the transmission of the second test to the application.

8. The method of claim 1, wherein determining if the functionality was invoked according to the benchmark comprises:
   receiving, through the application firewall, a response of the application; and
   comparing the response to the benchmark.

9. The method of claim 1, further comprising:
   transmitting the second test to the application directly; and
   recording as the benchmark, a response received directly from the application.

10. The method of claim 1, wherein the identified security defect is related to at least one of SQL injection, denial of service, credit card exposure, buffer overflow, Operating System (OS) command injection, and phishing.

11. The method of claim 1, wherein:
a plurality of firewall configuration parameters comprising the first firewall configuration parameter is associated with the application firewall; and
the first firewall configuration parameter is selected from the group consisting of: request limits parameters, cookie parameters, URL protection parameters, and parameters specifying processing of special characters or keywords.

12. A system comprising: a
first processor; and
a first memory coupled to the first processor, the first memory comprising instructions which, when executed by a processing unit comprising at least one of the first processor and a second processor, program the processing unit, for configuring an application firewall, to:
receive in a memory module comprising at least one of the first memory and a second memory coupled to the second processor, a current application firewall configuration comprising a value of a first firewall configuration parameter;
access information associated with an application to be protected by the application firewall;
generate an application architecture based on, at least in part, the accessed information;
identify a security defect in the application, wherein identification of the security defect includes analysis of the application architecture;
transmit through the application firewall, to the application, a first test that is adapted to expose the identified security defect in the application;
if the application firewall fails to block the transmission of the first test to the application, determine a modification to a value of the first firewall configuration parameter of the application firewall and adjust the first firewall configuration parameter according to the determined modification, so as to block the transmission of the first test to the application; and
transmit to the application, through the application firewall, a second test adapted to invoke a functionality of the application and determine if the functionality was invoked according to a benchmark, by receiving a result produced by the application, wherein the functionality of the application comprises functionality invoked in response to a user request.

13. The system of claim 12, wherein the instructions further program the processing unit to:
determine at least one user input field of the application to be protected by the application firewall; and
provide, as part of the second test, test data to the user input field.

14. The system of claim 12, wherein the instructions for identifying the security defect program the processing unit to identify an input field within the application that is vulnerable to a cross-site scripting attack.

15. The system of claim 12, wherein the instructions further program the processing unit to:
if, after the transmission of the second test, the functionality was not invoked according to the benchmark, determine a modification to at least one of the value of the first firewall configuration parameter and a value of a second firewall configuration parameter of the application firewall so as to permit invocation of the functionality according to the benchmark, in response to retransmission of the second test.

16. The system of claim 15, wherein the instructions further program the processing unit to:
if the modified application firewall fails to block the transmission of the first test to the application, determine at least one of: (i) another modification to the value of the first firewall configuration parameter, (ii) another modification to the value of the second firewall configuration parameter, and (iii) a modification to a value of a third firewall configuration parameter of the application firewall, so as to block the transmission of the first test to the application.

17. The system of claim 15, wherein the instructions further program the processing unit to:
if the modified application firewall fails to block the transmission of the first test to the application, notify a user that the identified security defect was not blocked by the application firewall.

18. The system of claim 12, wherein the instructions for determining if the functionality was invoked according to the benchmark program the processing unit to:
request and receive transaction data from the application firewall; and
determine using the transaction data if the application firewall blocked the transmission of the second test to the application.

19. The system of claim 12, wherein the instructions for determining if the functionality was invoked according to the benchmark program the processing unit to:
receive, through the application firewall, a response of the application; and
compare the response to the benchmark.

20. The system of claim 12, wherein the instructions further program the processing unit to:
transmit the second test to the application directly; and
record as the benchmark, a response received directly from the application.

21. The system of claim 12, wherein the identified security defect is related to at least one of SQL injection, denial of service, credit card exposure, buffer overflow, Operating System (OS) command injection, and phishing.

22. The system of claim 12, wherein:
a plurality of firewall configuration parameters comprising the first firewall configuration parameter is associated with the application firewall; and
the first firewall configuration parameter is selected from the group consisting of: request limits parameters, cookie parameters, URL protection parameters, and parameters specifying processing of special characters or keywords.

23. An article of manufacture comprising a non-transitory storage medium having stored therein instructions which, when executed by a processor, program the processor, for configuring an application firewall, to:
receive in memory coupled to the processor, a current application firewall configuration comprising a value of a first firewall configuration parameter;
access information associated with an application to be protected by the application firewall;
generate an application architecture based on, at least in part, the accessed information;
identify a security defect in the application, wherein identification of the security defect includes analysis of the application architecture;
transmit through the application firewall, to the application, a first test that is adapted to expose the identified security defect in the application;

if the application firewall fails to block the transmission of the first test to the application, determine a modification to the value of the first firewall configuration parameter of the application firewall and adjust the first firewall configuration parameter according to the determined modification, so as to block the transmission of the first test to the application; and transmit to the application, through the application firewall, a second test adapted to invoke a functionality of the application and determine if the functionality was invoked according to a benchmark, by receiving a result produced by the application, wherein the functionality of the application comprises functionality invoked in response to a user request.

\* \* \* \* \*